US010864441B2

(12) United States Patent
Tang et al.

(10) Patent No.: US 10,864,441 B2
(45) Date of Patent: Dec. 15, 2020

(54) INFORMATION PROCESSING METHOD, TERMINAL, AND COMPUTER STORAGE MEDIUM

(71) Applicant: Tencent Technology (Shenzhen) Company Limited, Shenzhen (CN)

(72) Inventors: Yong Tang, Shenzhen (CN); Yu Chen, Shenzhen (CN); Chuang Zhou, Shenzhen (CN); Wei Gong, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/670,803

(22) Filed: Oct. 31, 2019

(65) Prior Publication Data
US 2020/0061467 A1 Feb. 27, 2020

Related U.S. Application Data

(63) Continuation of application No. 15/817,004, filed on Nov. 17, 2017, now Pat. No. 10,493,361, which is a
(Continued)

(30) Foreign Application Priority Data

Oct. 10, 2015 (CN) .......................... 2015 1 0655696

(51) Int. Cl.
A63F 13/00 (2014.01)
A63F 13/52 (2014.01)
(Continued)

(52) U.S. Cl.
CPC .......... A63F 13/52 (2014.09); A63F 13/2145 (2014.09); A63F 13/25 (2014.09);
(Continued)

(58) Field of Classification Search
None
See application file for complete search history.

(56) References Cited

U.S. PATENT DOCUMENTS

2007/0238520 A1* 10/2007 Kacmarcik ............. A63F 13/10
463/33
2008/0214253 A1* 9/2008 Gillo ....................... A63F 13/35
463/1
(Continued)

FOREIGN PATENT DOCUMENTS

CN 1556722 A 12/2004
CN 1794252 A 6/2006
(Continued)

OTHER PUBLICATIONS

Tencent Technology, ISRWO, PCT/CN2016/083207, Jul. 27, 2016, 8 pgs.
Tencent Technology, IPRP, PCT/CN2016/083207, Apr. 10, 2018, 5 pgs.

Primary Examiner — Paul A D'Agostino
(74) Attorney, Agent, or Firm — Morgan, Lewis & Bockius LLP

(57) ABSTRACT

The present disclosure discloses a method for rendering a graphical user interface of an online game system on a display of a terminal, including: rendering, in the graphical user interface, at least one virtual resource object; detecting whether a configuration option in the game system is enabled, entering a first control mode in accordance with a determination that the configuration option is enabled; rendering, in a skill control display area in the graphical user interface, at least one skill object corresponding to multiple character objects; detecting, from a user of the terminal, a skill release operation gesture on the at least one skill object in the skill control display area; and performing a skill release operation, on a currently specified target object, of a
(Continued)

skill to be triggered and supported by at least one skill object corresponding to one or more of the multiple character objects.

12 Claims, 7 Drawing Sheets

Related U.S. Application Data continuation-in-part of application No. PCT/CN2016/083207, filed on May 24, 2016.

(51) Int. Cl.
| | |
|---|---|
| *A63F 13/2145* | (2014.01) |
| *A63F 13/55* | (2014.01) |
| *A63F 13/42* | (2014.01) |
| *A63F 13/428* | (2014.01) |
| *A63F 13/25* | (2014.01) |
| *A63F 13/30* | (2014.01) |

(52) U.S. Cl.
CPC .............. *A63F 13/30* (2014.09); *A63F 13/42* (2014.09); *A63F 13/428* (2014.09); *A63F 13/55* (2014.09)

(56) References Cited

U.S. PATENT DOCUMENTS

| | | | |
|---|---|---|---|
| 2010/0309197 A1* | 12/2010 | Porwal | A63F 13/21 345/419 |
| 2011/0007079 A1* | 1/2011 | Perez | H04N 21/4532 345/473 |
| 2013/0117377 A1* | 5/2013 | Miller | A63F 13/12 709/205 |
| 2013/0130792 A1* | 5/2013 | Crocker | A63F 13/52 463/31 |
| 2015/0072784 A1 | 3/2015 | Lee | |
| 2016/0155096 A1* | 6/2016 | Choi | G06Q 10/109 705/7.21 |
| 2016/0271496 A1* | 9/2016 | Behmaram-Mosavat | A63F 13/5375 |

FOREIGN PATENT DOCUMENTS

| | | |
|---|---|---|
| CN | 104093463 A | 10/2014 |
| CN | 104415536 A | 3/2015 |
| CN | 104922906 A | 9/2015 |
| CN | 105214309 A | 1/2016 |
| JP | 2015085179 A | 5/2015 |
| WO | WO 2015064362 A1 | 5/2015 |

* cited by examiner

INFORMATION PROCESSING METHOD, TERMINAL, AND COMPUTER STORAGE MEDIUM

CROSS-REFERENCE TO RELATED APPLICATIONS

This application is a continuation of U.S. application Ser. No. 15/817,004, entitled "INFORMATION PROCESSING METHOD AND TERMINAL, AND COMPUTER STORAGE MEDIUM" filed on Nov. 17, 2017, which is a continuation-in-part application of PCT/CN2016/083207, entitled "INFORMATION PROCESSING METHOD AND TERMINAL, AND COMPUTER STORAGE MEDIUM" filed on May 24, 2016, which claims priority to Chinese Patent Application No. 201510655696.6, filed with the State Intellectual Property Office of the People's Republic of China on Oct. 10, 2015, and entitled "INFORMATION PROCESSING METHOD, TERMINAL, AND COMPUTER STORAGE MEDIUM", all of which are incorporated herein by reference in their entirety.

FIELD OF THE TECHNOLOGY

The present disclosure relates to information exchange technologies, and in particular, to an information processing method, a terminal, and a computer storage medium.

BACKGROUND OF THE DISCLOSURE

With gradual popularization of large-screen and super-screen intelligent terminals, a processor of an intelligent terminal has an increasingly high processing capability, so that many applications that implement control based on man-machine interaction appear on a large screen or a super screen. In a process of implementing control based on man-machine interaction, multiple users may run different interaction modes by creating groups in one-to-one, one-to-many, and many-to-many forms, to obtain different interaction results. For example, in a graphical user interface obtained through rendering on a large screen or a super screen, after multiple users are grouped into two different groups, by means of control processing in man-machine interaction, information exchange may be performed between the different groups, and different interaction results are obtained according to a response to information exchange; and by means of control processing in man-machine interaction, information exchange may further be performed between group members in a same group, and different interaction results are obtained according to a response to information exchange.

In the existing technology, in an information exchange process, release of a particular capability may be triggered to enrich a presentation form and content of information, and different presentation forms and content of information may finally lead to different interaction results. Any group member in a group may control and release particular capabilities corresponding to multiple different identities. On one hand, because particular capabilities to be released and supported by different identities vary, a group member first needs to switch to a particular identity from a current identity, and then can release a particular capability corresponding to the particular identity. Consequently, skill release cannot be rapidly performed in a current control manner of releasing a particular capability, an interaction delay is increased, and an interaction processing speed is affected. On the other hand, skill release can also be performed without switching, but this is a control manner in which a system automatically performs skill release, and the manner is uncontrollable and has excessively high uncertainty, leading to low accuracy, and the manner cannot adapt to changing requirements of different scenarios, affecting precision and efficiency of interaction processing.

However, in related technologies, there is still no effective solution to the foregoing problem.

SUMMARY

In view of this, embodiments of the present application expect to provide an information processing method, a terminal, and a computer storage medium, so as to resolve at least a problem in the existing technology, so that a particular capability can be directly released without switching, and rapid skill release is implemented, thereby reducing an interaction delay, increasing an interaction processing speed, and a controllable skill release control manner is used and can adapt to changing requirements of different scenarios, thereby improving precision and efficiency of interaction processing.

The technical solutions in the embodiments of the present application are implemented as follows:

An embodiment of the present application provides A method for rendering a graphical user interface of an online game system on a display of a terminal having one or more processors and memory storing one or more programs to be executed by the one or more processors, the software application being implemented in a game system, and the method including:

rendering, in the graphical user interface, at least one virtual resource object;

detecting whether a configuration option corresponding to a first function in the game system is enabled, entering a first control mode in accordance with a determination that the configuration option is enabled, and performing rendering in a skill control display area in the graphical user interface, to obtain at least one skill object corresponding to i different character objects, where i is a positive integer greater than 1; and detecting, from a user of the terminal, a skill release operation gesture on the at least one skill object in the skill control display area, performing a skill release operation, on a currently specified target object, of a skill to be triggered and supported by at least one skill object corresponding to one or more of the multiple character objects.

An embodiment of the present application further provides a terminal, a software application being executed on a processor of the terminal and rendering being performed on a display of the terminal, to obtain a graphical user interface, the processor, the graphical user interface, and the software application being implemented in a game system, and the terminal further including:

a first rendering unit, configured to perform rendering in the graphical user interface, to obtain at least one virtual resource object;

a first detection unit, configured to: detect whether a configuration option corresponding to a first function in the game system is enabled, enter a first control mode if the configuration option is enabled, and perform rendering in a skill control display area in the graphical user interface, to obtain at least one skill object corresponding to i different character objects, where i is a positive integer greater than 1; and a skill release unit, configured to: control, when a skill release operation gesture that is in the skill control display area and that is for the at least one skill object is obtained, to perform skill release, on a currently specified target object, of a skill to be triggered and supported by at least one skill object corresponding to one or more of the multiple character objects.

An embodiment of the present application further provides a terminal, the terminal including: a display and a processor; the display being configured to: execute a software application on the processor of the terminal and then perform rendering on the software application, to obtain a graphical user interface; and the graphical user interface being configured to facilitate control processing in man-machine interaction;

the processor being configured to perform the information processing method in any one of the foregoing solutions; and the processor, the graphical user interface, and the software application being implemented in a game system.

An embodiment of the present application further provides a computer storage medium, a computer executable instruction being stored in the computer storage medium, and the computer executable instruction being configured to perform the information processing method according to any one of the foregoing solutions.

In the information processing method in the embodiments of the present application, a software application is executed on a processor of a terminal and rendering is performed on a display of the terminal, to obtain a graphical user interface, the processor, the graphical user interface, and the software application are implemented in a game system, and the method includes: rendering, in the graphical user interface, at least one virtual resource object; detecting whether a configuration option corresponding to a first function in the game system is enabled, entering a first control mode in accordance with a determination that the configuration option is enabled, and performing rendering in a skill control display area in the graphical user interface, to obtain at least one skill object corresponding to i different character objects, where i is a positive integer greater than 1; and detecting, from a user of the terminal, a skill release operation gesture on the at least one skill object in the skill control display area, performing a skill release operation, on a currently specified target object, of a skill to be triggered and supported by at least one skill object corresponding to one or more of the multiple character objects.

By means of the embodiments of the present application, a first control mode is entered when it is detected that a configuration option corresponding to a first function in a game system is enabled, where the first control mode is a skill release control manner that can be controlled manually. Rendering can be performed in a skill control display area in a graphical user interface, to obtain at least one skill object corresponding to i different character objects. Therefore, it may be directly controlled, when a skill release operation gesture that is in the skill control display area and that is for the at least one skill object is obtained, to perform skill release, on a currently specified target object, of a skill to be triggered and supported by at least one skill object corresponding to one or more of the multiple character objects, so that it does not need to first switch to a required character object from a current character object and then perform skill release by using a corresponding skill object. In addition, the skill release control manner that can be manually controlled is a controllable skill release control manner and has high controllability and certainty, thereby greatly improving accuracy, and the manner can also adapt to changing requirements of different scenarios, thereby improving precision and efficiency of interaction processing.

DESCRIPTION OF EMBODIMENTS

Implementation of the technical solutions is further described in detail below with reference to the accompanying drawings.

Figure 1:
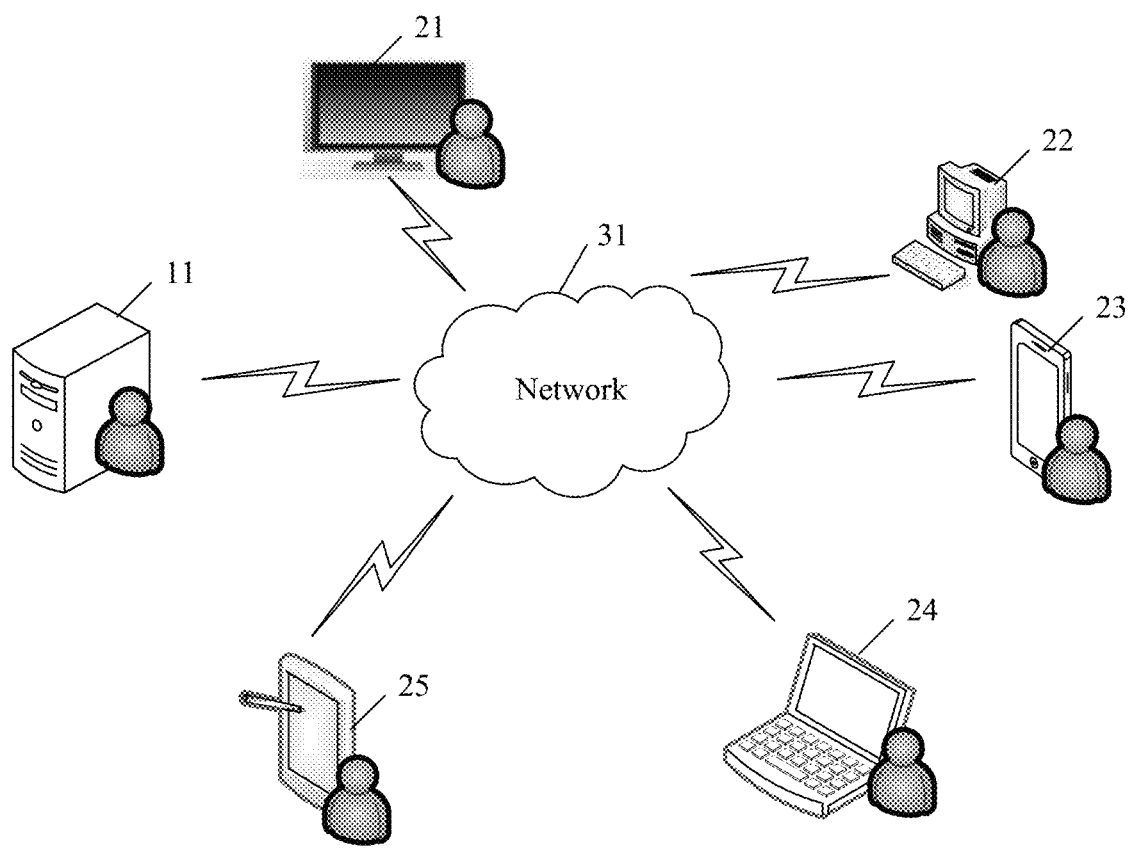
FIG. 1 is a schematic diagram of various hardware entities that perform information exchange according to an embodiment of the present application.

FIG. 1 is a schematic diagram of various hardware entities that perform information exchange according to an embodiment of the present application. FIG. 1 includes: one or more servers, where a server 11 in FIG. 1 is only an example, terminal devices 21 to 25, and a network 31. The network 31 includes network entities such as a router and a gateway, which are not shown in the figure. The terminal devices 21 to 25 perform information exchange with the server by using a wired network or a wireless network, so as to download an application and/or an application update data packet and/or application related data information or service information from the server 11. A type of the terminal device is shown in FIG. 1, and includes a mobile phone (the terminal 23), a tablet computer or a PDA (the terminal 25), a desktop computer (the terminal 22), a PC (the terminal 24), an all-in-one PC (the terminal 21), and other types. Various applications, for example, an application having an entertainment function (such as a video application, an audio play application, a game application, or reading software) or an application having a serving function (such as a map navigation application, or a group purchasing application), required by a user are installed in the terminal device.

Based on a system shown in FIG. 1, a game scene is used as an example. The terminal devices 21 to 25 download, by using the network 31, a game application and/or a game application update data packet and/or game application related data information or service information from the server 11 according to a requirement. By means of embodiments of the present application, after the game application is started on the terminal device and a game interface obtained through rendering is entered, it is detected whether a configuration option corresponding to a first function in the game system is enabled, a first control mode is entered if the configuration option is enabled, and rendering is performed in a skill control display area in the graphical user interface, to obtain at least one skill object corresponding to i different character objects, where i is a positive integer greater than 1; and it is controlled, when a skill release operation gesture that is in the skill control display area and that is for the at least one skill object is obtained, to perform skill release, on a currently specified target object, of a skill to be triggered and supported by at least one skill object corresponding to a first character object and at least one skill object corresponding to an $i^{th}$ character object, so that it does not need to first switch to a required character object from a current character object and then perform skill release by using a corresponding skill object. In addition, the skill release control manner that can be manually controlled is a controllable skill release control manner and has high controllability and certainty, thereby greatly improving accuracy, and the manner can also adapt to changing requirements of different scenarios, thereby improving precision and efficiency of interaction processing.

The example in FIG. 1 is only an example of a system architecture for implementing the embodiments of the present application, and the embodiments of the present application are not limited to the system architecture in FIG. 1. Based on the system architecture, various embodiments of the present application are provided.

Embodiment 1

Figure 2:
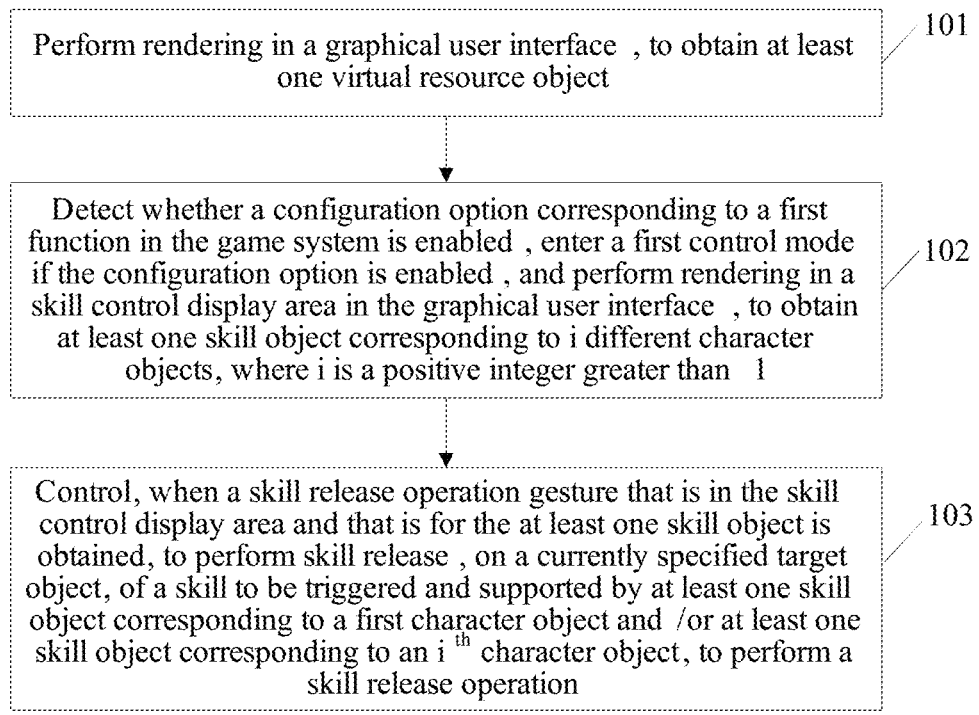
FIG. 2 is a schematic flowchart of implementation of Embodiment 1 of the present application.

This embodiment of the present application provides an information processing method. A software application is executed on a processor of a terminal and rendering is performed on a display of the terminal, to obtain a graphical user interface. The processor, the graphical user interface, and the software application are implemented in a game system. As shown in FIG. 2, the method includes the following steps:

Step 101: Perform rendering in the graphical user interface, to obtain at least one virtual resource object.

Herein, the virtual resource object is covered in various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present application.

Step 102: Detect whether a configuration option corresponding to a first function in the game system is enabled, enter a first control mode if the configuration option is enabled, and perform rendering in a skill control display area in the graphical user interface, to obtain at least one skill object corresponding to i different character objects, where i is a positive integer greater than 1.

Figure 3:
FIG. 3, FIG. 4, FIG. 6, and FIG. 7 are schematic diagrams of application of multiple obtained user interaction interfaces (UI) according to embodiments of the present application.

Herein, FIG. 3 is a schematic diagram of a UI of a configuration option corresponding to a first function in a game system. This is only an example, and is not limited to a displayed setting in the UI in FIG. 3, and examples that can achieve an objective of enabling the first function shall all fall within the protection scope of the embodiments of the present application.

Figure 4:
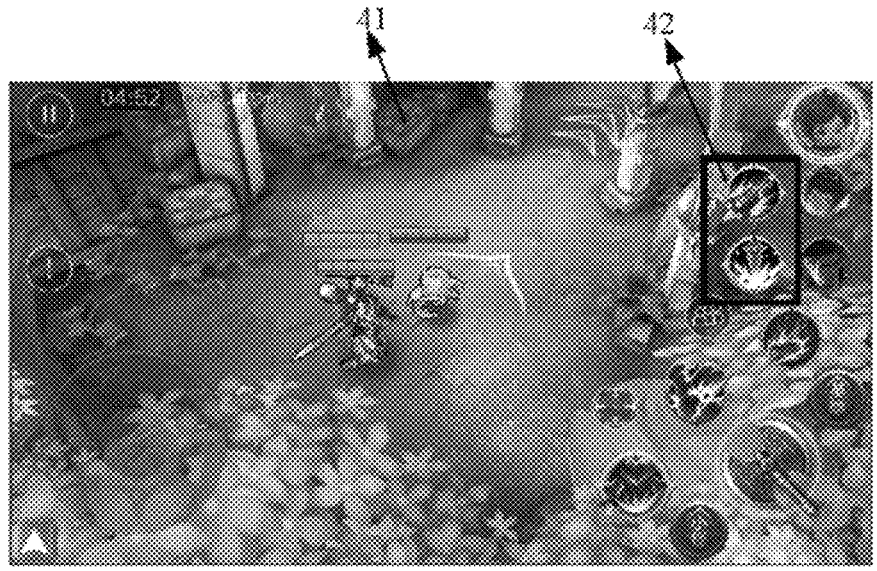

In FIG. 3, a setting interface in the game system is denoted by a1, the configuration option corresponding to the first function is denoted by a2, and the option is specifically an "ultimate skill switch". When the option "ultimate skill switch" is "ON", the first function is enabled to enable an ultimate skill, and the first control mode is entered. The first control mode may be specifically a skill release control mode in which an ultimate skill is controlled and selected manually. In this case, after the graphical user interface such as a game interface is entered, as shown in FIG. 4, a skill control display area 42 is displayed in the game interface 41. Multiple skills corresponding to multiple character identities that can be selected by members in one group or multiple skills corresponding to a group member (for example, an AI teammate) in a same group are displayed in the skill control display area 42. Herein, it should be noted that, multiple skills displayed in the skill control display area 42 may be only ultimate skills that are highly destructive in skills, or may be basic attack skills (referred to as normal skills for short below, to be distinguished from ultimate skills).

Herein, in a process of implementing control based on man-machine interaction in the graphical user interface, creation of different groups by multiple users in a one-to-one, one-to-many, and many-to-many forms to run different interaction modes is supported. Therefore, different interaction results are obtained. The different interaction modes include a versus mode between multiple online users, and further include an offline versus mode without an Internet connection.

The versus mode between multiple users and the offline versus mode without an Internet connection are both applicable to the UI shown in FIG. 4. Herein, it should be noted that, the UI shown in FIG. 4 is obtained through rendering by a processor of a terminal device, which is specifically an image processor. This is only a specific example. The specific example is applicable to different personnel deployment scenarios in a game, for example, numbers of deployed persons of two parties are 1 to 1, 3 to 3, or 5 to 5, and is also applicable to scenarios in which numbers of deployed persons of two parties are different in a game, for example, a scenario in which numbers of deployed persons are 40 to 20 or 30 to 60, to run a mode in a game in which a skill release location and direction are determined by using a wheel at a fixed location. For example, for the versus mode between multiple online users, the multiple users are grouped into different groups, each group includes at least one group member, and the different groups are marked as at least a first group (for example, our group) and a second group (for example, an opponent group). If there is only one person in our group, and there is also only one person in the opponent group, it is the "1 to 1" mode mentioned above. If there are only three persons in our group, and there are also three persons in the opponent group, it is the "3 to 3" mode mentioned above. If there are only five persons in our group, and there are also only five persons in the opponent group, it is the "5 to 5" mode mentioned above. Certainly, for the opponent group and our group, it is not necessarily to deploy a same number of persons, and different numbers of persons may be deployed.

Step 103: Control, when a skill release operation gesture that is in the skill control display area and that is for the at least one skill object is obtained, to perform skill release, on a currently specified target object, of a skill to be triggered and supported by at least one skill object corresponding to a first character object and at least one skill object corresponding to an $i^{th}$ character object.

Herein, the currently specified target object may be a current object attacked by the user, the obtaining a skill release operation gesture that is in the skill control display area and that is for the at least one skill object may be manually taping an ultimate skill and/or a normal skill in the skill control display area 42. It should be noted that, it is not to manually tap a character object avatar at the right side of the skill control display area 42, it is directly to tap an ultimate skill and/or a normal skill to be released for use and correspondingly supported by a character object at the right side of the skill control display area 42. Therefore, by means of this embodiment of the present application, it is feasible that skill release can be directly performed without switching a character object. In this way, a battle pace can be better controlled according to a user requirement, thereby shortening an interaction and response time, there is no delay, skill release can be rapidly performed, and effective attack can be launched on the current target object.

Herein, for directly tapping an ultimate skill and/or a normal skill to be released for use and correspondingly supported by a character object at the right side of the skill control display area 42, according to requirements of identified different scenarios, only one skill in the skill control display area 42 may be released, for example, continuous attack, or a combined skill including at least two skills in the skill control display area 42 may be released, to increase an attack rating and a success rate. For example, during a fight against a BOSS, such a skill release operation using a combined skill can be used. In addition, a combined skill is generated by directly tapping a skill to be released for use and correspondingly supported by a character object at the right side of the skill control display area 42, and is not a hosting behavior of system automatic control. Because a hosting behavior of system automatic control cannot accurately meet a requirement in the scenario, a combined skill in a corresponding scenario is selected and released in such a controllable manual operation mode, so as to avoid invalid and worthless release of an ultimate skill.

As can be learned, by means of this embodiment of the present application, only several simple man-machine interaction operations are required to enable the ultimate skill switch option, perform rendering to display an ultimate skill and/or a normal skill to be released for use and correspondingly supported by a character object at the right side of the skill control display area 42, and tap a selectable ultimate skill and/or normal skill in the skill control display area 42, to release a corresponding single skill or combined skill, thereby increasing an attack rating and a success rate. In an entire man-machine interaction process, in such a skill release control mode in which an ultimate skill is controlled and selected manually, it does not need to first switch to a required character object from a current character object and then perform skill release by using a corresponding skill object, thereby improving convenience of skill release and reducing an interaction delay, and such a skill release control mode in which an ultimate skill is controlled and selected manually has a high controllability and certainty, thereby greatly improving accuracy, and the manner can also adapt to changing requirements of different scenarios, thereby improving precision and efficiency of interaction processing.

Based on Embodiment 1, the at least one skill object that corresponds to the i different character objects and that is obtained through rendering in the skill control display area is a skill that can be controlled and released by a user of the terminal, and a skill that cannot be currently controlled and released by the user is not displayed in the skill control display area 42 shown in FIG. 4. For this case, description is provided by using an example in the following Embodiment 2.

Embodiment 2

Figure 5:
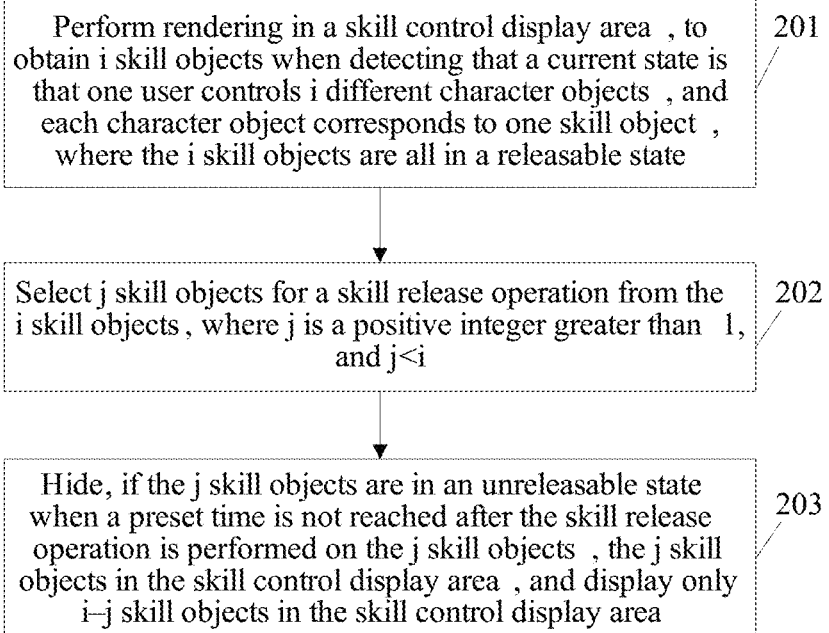
FIG. 5 is a schematic flowchart of implementation of Embodiment 2 of the present application.

This embodiment of the present application provides an information processing method. A software application is executed on a processor of a terminal and rendering is performed on a display of the terminal, to obtain a graphical user interface. The processor, the graphical user interface, and the software application are implemented in a game system. As shown in FIG. 5, the method includes the following steps:

Step 201: Perform rendering in a skill control display area, to obtain multiple skill objects when detecting that a current state is that one user controls i different character objects, and each character object corresponds to one skill object, where the multiple skill objects are all in a releasable state.

Step 202: Select j skill objects for a skill release operation from the multiple skill objects, where j is a positive integer greater than 1, and j<i.

Step 203: Hide, when the subset of the multiple skill objects are in an unreleasable state and when a preset time is not reached after the skill release operation is performed on the subset of the multiple skill objects, the subset of the multiple skill objects in the skill control display area, and display only the remainder of the multiple skill objects in the skill control display area.

Step 204: Display, if detecting that the subset of the multiple skill objects are restored to the releasable state when the preset time is reached, the previously hidden subset of the multiple skill objects in the skill control display area again.

Figure 6:
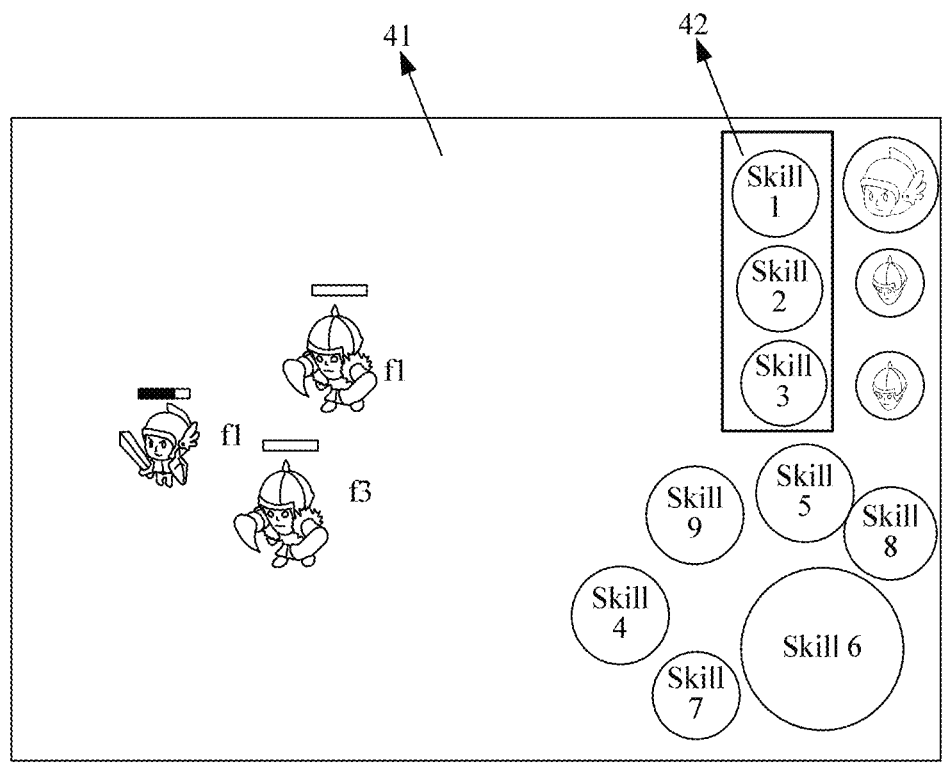
Figure 7:
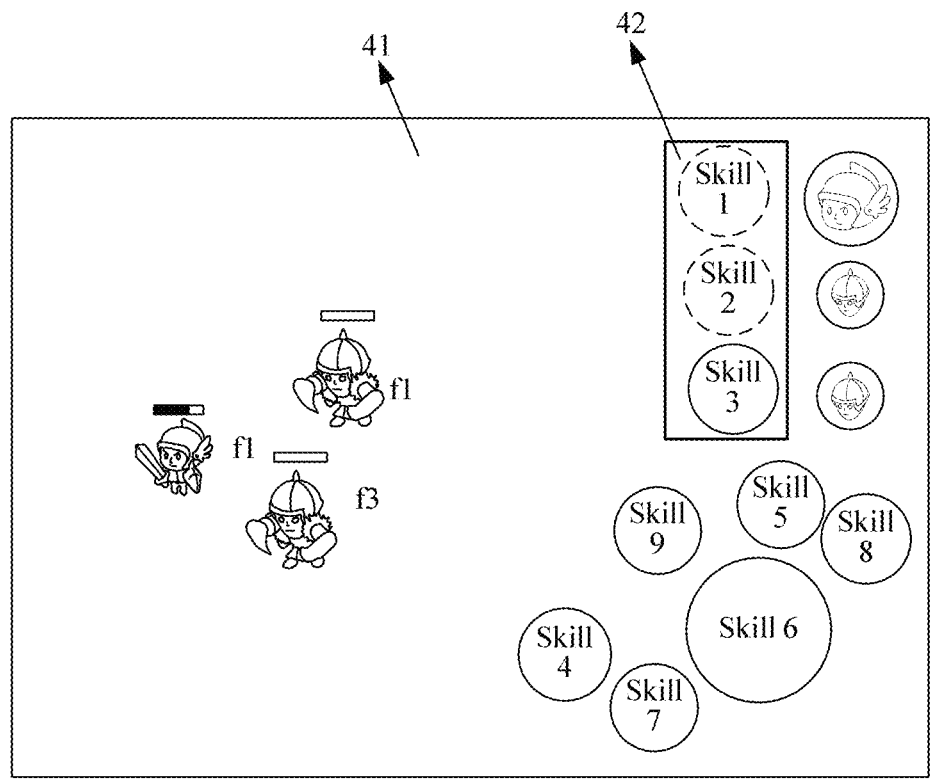

Herein, as shown in FIG. 6, different skill objects (a skill 1 to a skill 3) respectively corresponding to different character objects (a character f1 to a character f3) that can be controlled by a user are displayed at the right side of a skill control display area 42. A specific display change process in the skill control display area 42 is as follows: 1) First, the multiple skill objects are all in a releasable state; therefore, the skill 1 to the skill 3 can all be displayed in the skill control display area 42 currently. 2) After the skill release operation is performed on two skill objects of the skill 1 to the skill 3, the two skill objects enter a CD mode (that is, after a skill is released, the skill is used up, and the skill can be used again after a particular time, for example, it needs to wait for a period of time before respawn with full HP). In this case, only the skill 3 can be displayed in the skill control display area 42, the skill 1 and the skill 2 are deleted, or the skill 1 and the skill 2 are not deleted, but the skill 1 and the skill 2 are hidden. In this case, a combined skill including the skill 1 to the skill 3 cannot be used, the skill 1 and skill 2 are currently in a CD mode and are in an unreleasable state, and only the skill 3 can be displayed and is in a releasable state, as shown in FIG. 7. 3) Finally, after the skill 1 and the skill 2 reach a preset time, and are in a releasable state again, the skill 1 and the skill 2 are displayed in the skill control display area 42 again, and the user may use the combined skill including the skill 1 to the skill 3 at this time.

Herein, one of the skill 1 to the skill 3 may be separately released, any two of the skill 1 to the skill 3 may be released in a combined manner, or the three skills are released at the same time.

In an implementation of this embodiment of the present application, the method further includes:

Step 301: Detect whether a configuration option corresponding to a first function in the game system is enabled, and enter a second control mode if the configuration option is enabled or the configuration option is disabled after being enabled, where in a second control mode, it is default that m skill objects in at least one skill object of the i different character objects are automatically controlled by the system, where m is a positive integer greater than 1, and m<i.

Herein, the second control mode may be specifically a skill release control mode of system automatic control, that is, release of one or more default skills is hosted by a computer, to automatically control and select skill release of an ultimate skill. However, the second control mode is low in accuracy, and needs to be used by combining the first control mode (for example, the skill release control mode in which an ultimate skill is controlled and selected manually), for example, the ultimate skill mode is more destructive, and an ultimate skill that is destructive is released by using the skill release control mode in which an ultimate skill is controlled and selected manually. Some normal skills do not need to be manually selected by the user, and a normal skill may be released by using the skill release control mode of system automatic control.

Step 302: Control, when obtaining a skill release operation gesture that is in the skill control display area and that is for the at least one skill object, to perform skill release, on a currently specified target object, of a skill to be triggered and supported by at least one skill object corresponding to one or more of the remainder of the multiple character objects, where the game system automatically controls the release of one or more of the remaining skill objects in a combined manner.

Herein, it is an example in which the first control mode (for example, the skill release control mode in which an ultimate skill is controlled and selected manually) is combined with the second control mode (the skill release control mode of system automatic control) for use. There are i skills in total, including an ultimate skill and a normal skill. In the i skills, m skill objects are configured in such a manner that the system automatically controls to separately release any one of the m skill objects or release multiple of the m skill objects in a combined manner, so that i-m may be manually selected by the user, that is, the second control mode (the skill release control mode of system automatic control) is used. Therefore, accuracy of manual control, controllability, a matching degree of scenario identifiability, and convenience of automatic control can be considered, an optimal interaction result is obtained, and a rating and a success rate are both very high.

Embodiment 3

Figure 8:
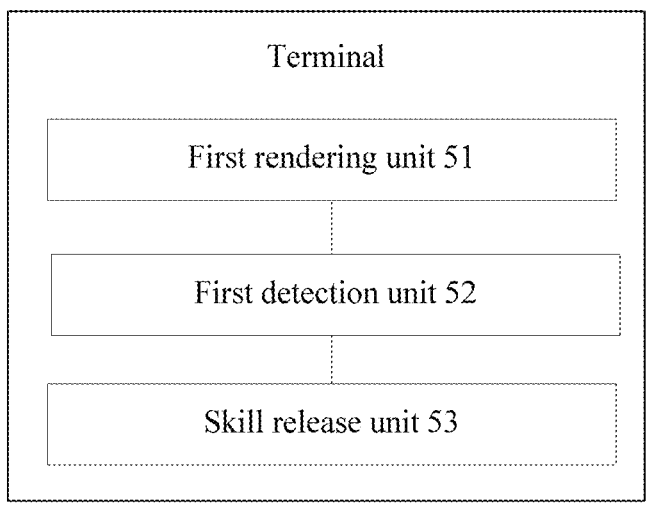
FIG. 8 is a schematic structural diagram according to Embodiment 3 of the present application.

This embodiment of the present application provides a terminal. A software application is executed on a processor of the terminal and rendering is performed on a display of the terminal, to obtain a graphical user interface. The processor, the graphical user interface, and the software application are implemented in a game system. As shown in FIG. 8, the terminal further includes:

a first rendering unit 51, configured to perform rendering in the graphical user interface, to obtain at least one virtual resource object;

a first detection unit 52, configured to: detect whether a configuration option corresponding to a first function in the game system is enabled, enter a first control mode if the configuration option is enabled, and perform rendering in a skill control display area in the graphical user interface, to obtain at least one skill object corresponding to i different character objects, where i is a positive integer greater than 1; and a skill release unit 53, configured to: control, when a skill release operation gesture that is in the skill control display area and that is for the at least one skill object is obtained, to perform skill release, on a currently specified target object, of a skill to be triggered and supported by at least one skill object corresponding to a first character object and at least one skill object corresponding to an $i^{th}$ character object.

In an actual application of the embodiments of the present application, the virtual resource object is covered in various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present application.

Herein, FIG. 3 is a schematic diagram of a UI of a configuration option corresponding to a first function in a game system. This is only an example, and is not limited to a displayed setting in the UI in FIG. 3, and examples that can achieve an objective of enabling the first function shall all fall within the protection scope of the embodiments of the present application.

In FIG. 3, a setting interface in the game system is denoted by a1, the configuration option corresponding to the first function is denoted by a2, and the option is specifically an "ultimate skill switch". When the option "ultimate skill switch" is "ON", the first function is enabled to enable an ultimate skill, and the first control mode is entered. The first control mode may be specifically a skill release control mode in which an ultimate skill is controlled and selected manually. In this case, after the graphical user interface such as a game interface is entered, as shown in FIG. 4, a skill control display area 42 is displayed in the game interface 41. Multiple skills corresponding to multiple character identities that can be selected by members in one group or multiple skills corresponding to a group member (for example, an AI teammate) in a same group are displayed in the skill control display area 42. Herein, it should be noted that, multiple skills displayed in the skill control display area 42 may be only ultimate skills that are highly destructive in skills, or may be basic attack skills (referred to as normal skills for short below, to be distinguished from ultimate skills).

Herein, in a process of implementing control based on man-machine interaction in the graphical user interface, creation of different groups by multiple users in a one-to-one, one-to-many, and many-to-many forms to run different interaction modes is supported. Therefore, different interaction results are obtained. The different interaction modes include a versus mode between multiple online users, and further include an offline versus mode without an Internet connection.

The versus mode between multiple users and the offline versus mode without an Internet connection are both applicable to the UI shown in FIG. 4. Herein, it should be noted that, the UI shown in FIG. 4 is obtained through rendering by a processor of a terminal device, which is specifically an image processor. This is only a specific example. The specific example is applicable to different personnel deployment scenarios in a game, for example, numbers of deployed persons of two parties are 1 to 1, 3 to 3, or 5 to 5, and is also applicable to scenarios in which numbers of deployed persons of two parties are different in a game, for example, a scenario in which numbers of deployed persons are 40 to 20 or 30 to 60, to run a mode in a game in which a skill release location and direction are determined by using a wheel at a fixed location. For example, for the versus mode between multiple online users, the multiple users are grouped into different groups, each group includes at least one group member, and the different groups are marked as at least a first group (for example, our group) and a second group (for example, an opponent group). If there is only one person in our group, and there is also only one person in the opponent group, it is the "1 to 1" mode mentioned above. If there are only three persons in our group, and there are also three persons in the opponent group, it is the "3 to 3" mode mentioned above. If there are only five persons in our group, and there are also only five persons in the opponent group, it is the "5 to 5" mode mentioned above. Certainly, for the opponent group and our group, it is not necessarily to deploy a same number of persons, and different numbers of persons may be deployed.

Herein, the currently specified target object may be a current object attacked by the user, the obtaining a skill release operation gesture that is in the skill control display area and that is for the at least one skill object may be manually taping an ultimate skill and/or a normal skill in the skill control display area 42. It should be noted that, it is not to manually tap a character object avatar at the right side of the skill control display area 42, it is directly to tap an ultimate skill and/or a normal skill to be released for use and correspondingly supported by a character object at the right side of the skill control display area 42. Therefore, by means of this embodiment of the present application, it is feasible that skill release can be directly performed without switching a character object. In this way, a battle pace can be better controlled according to a user requirement, thereby shortening an interaction and response time, there is no delay, skill release can be rapidly performed, and effective attack can be launched on the current target object.

Herein, for directly tapping an ultimate skill and/or a normal skill to be released for use and correspondingly supported by a character object at the right side of the skill control display area 42, according to requirements of identified different scenarios, only one skill in the skill control display area 42 may be released, for example, continuous attack, or a combined skill including at least two skills in the skill control display area 42 may be released, to increase an attack rating and a success rate. For example, during a fight against a BOSS, such a skill release operation using a combined skill can be used. In addition, a combined skill is generated by directly tapping a skill to be released for use and correspondingly supported by a character object at the right side of the skill control display area 42, and is not a hosting behavior of system automatic control. Because a hosting behavior of system automatic control cannot accurately meet a requirement in the scenario, a combined skill in a corresponding scenario is selected and released in such a controllable manual operation mode, so as to avoid invalid and worthless release of an ultimate skill.

In an implementation of this embodiment of the present application, the at least one skill object that corresponds to the i different character objects and that is obtained through rendering in the skill control display area is a skill that can be controlled and released by a user of the terminal.

In an implementation of this embodiment of the present application, the terminal further includes:

a second detection unit, configured to perform rendering in the skill control display area, to obtain multiple skill objects when detecting that a current state is that one user controls the i different character objects, and each character object corresponds to one skill object, where the multiple skill objects are all in a releasable state; and a skill release control unit, further configured to: select j skill objects for the skill release operation from the multiple skill objects, where j is a positive integer greater than 1, and j<i; and hide, when the subset of the multiple skill objects are in an unreleasable state and when a preset time is not reached after the skill release operation is performed on the subset of the multiple skill objects, the subset of the multiple skill objects in the skill control display area, and display only the remainder of the multiple skill objects in the skill control display area, where the skill release control unit is further configured to display, if it is detected that the subset of the multiple skill objects are restored to the releasable state when the preset time is reached, the previously hidden subset of the multiple skill objects in the skill control display area again.

Herein, as shown in FIG. 6, different skill objects (a skill 1 to a skill 3) respectively corresponding to different character objects (a character f1 to a character f3) that can be controlled by a user are displayed at the right side of the skill control display area 42. A specific display change process in the skill control display area 42 is as follows: 1) First, the multiple skill objects are all in a releasable state; therefore, the skill 1 to the skill 3 can all be displayed in the skill control display area 42 currently. 2) After the skill release operation is performed on two skill objects of the skill 1 to the skill 3, the two skill objects enter a CD mode (that is, after a skill is released, the skill is used up, and the skill can be used again after a particular time, for example, it needs to wait for a period of time before respawn with full HP). In this case, only the skill 3 can be displayed in the skill control display area 42, the skill 1 and the skill 2 are deleted, or the skill 1 and the skill 2 are not deleted, but the skill 1 and the skill 2 are hidden. In this case, a combined skill including the skill 1 to the skill 3 cannot be used, the skill 1 and skill 2 are currently in a CD mode and are in an unreleasable state, and only the skill 3 can be displayed and is in a releasable state, as shown in FIG. 7. 3) Finally, after the skill 1 and the skill 2 reach a preset time, and are in a releasable state again, the skill 1 and the skill 2 are displayed in the skill control display area 42 again, and the user may use the combined skill including the skill 1 to the skill 3 at this time.

Herein, one of the skill 1 to the skill 3 may be separately released, any two of the skill 1 to the skill 3 may be released in a combined manner, or the three skills are released at the same time.

In an implementation of this embodiment of the present application, the first detection unit is further configured to: detect whether the configuration option corresponding to the first function in the game system is enabled, and enter a second control mode if the configuration option is enabled or the configuration option is disabled after being enabled, where in a second control mode, it is default that m skill objects in the at least one skill object of the i different character objects are automatically controlled by the system, where m is a positive integer greater than 1, and m<i; and the skill release unit is further configured to: control, when the skill release operation gesture that is in the skill control display area and that is for the at least one skill object is obtained, to perform skill release, on a currently specified target object, of a skill to be triggered and supported by at least one skill object corresponding to one or more of the remainder of the multiple character objects, where the game system automatically controls the release of one or more of the remaining skill objects in a combined manner.

Herein, it is an example in which the first control mode (for example, the skill release control mode in which an ultimate skill is controlled and selected manually) is combined with the second control mode (the skill release control mode of system automatic control) for use. There are i skills in total, including an ultimate skill and a normal skill. In the i skills, m skill objects are configured in such a manner that the system automatically controls to separately release any one of the m skill objects or release multiple of the m skill objects in a combined manner, so that i-m may be manually selected by the user, that is, the second control mode (the skill release control mode of system automatic control) is used. Therefore, accuracy of manual control, controllability, a matching degree of scenario identifiability, and convenience of automatic control can be considered, an optimal interaction result is obtained, and a rating and a success rate are both very high.

Embodiment 4

Figure 9:
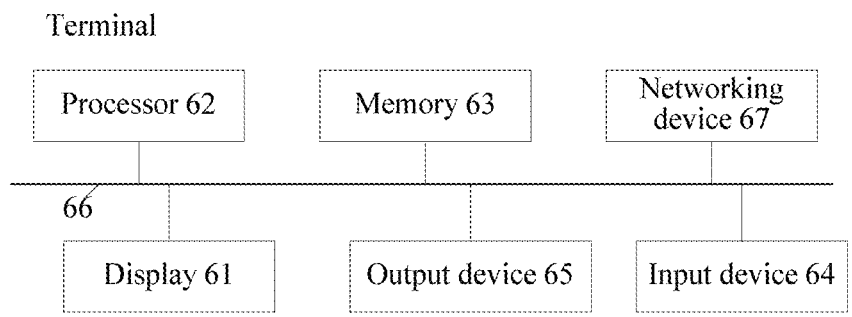
FIG. 9 is a schematic structural diagram of hardware entities according to Embodiment 4 of the present application.

This embodiment of the present application provides a terminal. As shown in FIG. 9, the terminal includes: a display 61 and a processor 62. The display 61 is configured to: execute a software application on the processor of the terminal and then perform rendering on the software application, to obtain a graphical user interface. The graphical user interface is configured to facilitate control processing in man-machine interaction. The processor 62 is configured to perform the information processing method in the embodiments of the present application. The processor, the graphical user interface, and the software application are implemented in a game system.

In this embodiment, the terminal further includes: a memory 63, an input device 64 (for example, a peripheral device such as a collection device including a camera, a microphone, and a headset; a mouse, a joystick, or a desktop computer keyboard; or a physical keyboard or a touchscreen on a notebook computer or a tablet computer), an output device 65 (for example, an audio output device or a video output device including a speaker, a headset, and the like), a bus 66, and a networking device 67. The processor 62, the memory 63, the input device 64, the display 61, and the networking device 67 are connected by using the bus 66, and the bus 66 is used for data transmission and communication between the processor 62, the memory 63, the display 61, and the networking device 67.

In some embodiments, the memory 63 is a non-transitory computer readable storage medium storing multiple program modules including an operating system that includes procedures for handling various basic system services and for performing hardware dependent tasks, a network communications module for connecting the computer server to other computers (e.g., the terminal devices) via the one or more communication network interfaces (wired or wireless) and one or more communication networks, such as the Internet, other wide area networks, local area networks, metropolitan area networks, and so on, and one or more application program.

The input device 64 is mainly configured to obtain an input operation of a user, and the input device 64 may vary with the terminal. For example, when the terminal is a PC, the input device 64 may be an input device such as a mouse or a keyboard; when the terminal is portable device such as a smartphone or a tablet computer, the input device 64 may be a touchscreen. The networking device 67 is used by multiple terminals and a server to connect and upload and download data by using a network, and used by multiple terminals to connect and perform data transmission by using a network.

The server may be formed by a cluster system, and to implement functions of various units, the functions may be combined or functions of the units are separately provided in an electronic device. Either the terminal or the server at least includes a database for storing data and a processor for data processing, or includes a storage medium disposed in the server or a storage medium that is disposed separately. For the processor for data processing, during processing, a microprocessor, a central processing unit (CPU), a digital signal processor (DSP), or a field programmable gate array (FPGA) may be used for implementation. The storage medium includes an operation instruction, the operation instruction may be computer executable code, and steps in the procedure of the information processing method in the embodiments of the present application are implemented by using the operation instruction.

Embodiment 5

This embodiment of the present application provides a computer storage medium. A computer executable instruction is stored in the computer storage medium, and the computer executable instruction is configured to perform the information processing method in the embodiments of the present application.

This embodiment of the present application is described below by using an actual application scenario as an example.

This application scenario is related to Multiplayer Online Battle Arena Games (MOBA). In MOBA, related terms are as follows: 1) UI layer, that is, an icon in a graphical user interface; 2) skill indicator: a special effect, a halo, or an operation used to supplement skill release; 3) lens, which may be understood as a camera in the game; 4) mini map: a scaled-down version of a large map, which may be understood as a radar map, where information and locations of two parties are displayed in the map; 5) wheel: a halo displayed above a skill key when the skill key is pressed; and 6) virtual joystick: a control for an operation and locating in the wheel.

In this application scenario, by means of this embodiment of the present application, in current game products of the phone game MOBA, for an operation of controlling multiple characters by one person, usually, an avatar is tapped to switch to an avatar of a corresponding hero to perform a skill release operation corresponding to the hero (ultimate skills and normal skills to be released and supported by avatar s of heroes as character objects are different). That is, an ultimate skill cannot be manually released by a user without switching an avatar of a hero, and skill release is automatically controlled by the system in a hosting manner. After release, the skill enters a CD mode. Because automatic control cannot completely match the scenario, if skill release is automatically controlled by the system in a hosting manner, and an incorrect skill is released, when the user needs to use the skill, the skill is still in a CD mode, leading to a series of problems existing in the existing technology in the background, such as greatly affecting an interaction effect and a response speed.

Figure 10:
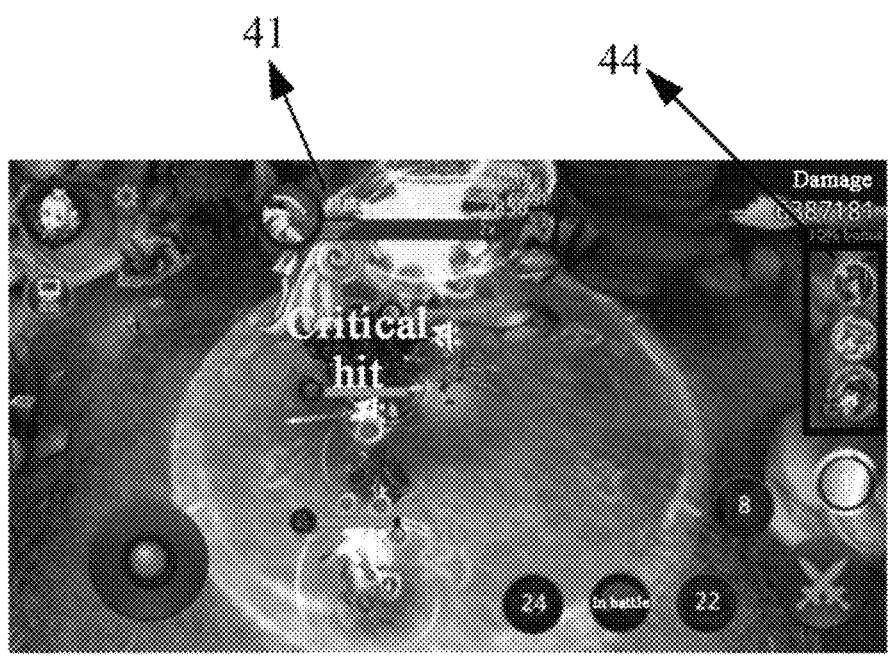
FIG. 10 is a schematic diagram of application of a UI obtained in the existing technology.

FIG. 10 is a schematic diagram of a UI in an existing skill release control mode. FIG. 10 includes a game interface 41 and a hero avatar display area 44. In the existing technology, a user first needs to manually tap an avatar of a hero to switch between different heroes, and the switching is time-consuming and laborious; then, a skill corresponding to the avatar of the hero can be released. That is, the user cannot release an ultimate skill manually without switching the avatar of the hero, but instead, skill release of the ultimate skill is automatically controlled by the system in a hosting manner. In addition, a skill that can be currently controlled to be released can only be a skill corresponding to one current hero, and it is very difficult to directly perform a combined operation of a skill combination of multiple heroes. Only a skill corresponding to one current hero can be released, and skill release of other skills may be automatically controlled by the system in a hosting manner. Consequently, accuracy is low, and many battle scenes cannot be identified. If skill release is automatically controlled by the system in a hosting manner, a skill may be released tactlessly, leading to degradation of battle experience, and a very poor interaction result.

In this application scenario, by means of this embodiment of the present application, as shown in FIG. 3, it is determined whether an ultimate skill switch is on to determine whether the skill release control mode is a first control mode (a manual control mode) or a second control mode (a system automatic control mode with hosting). In the first control mode, as shown in FIG. 6, one AI hero has three skills, where an ultimate skill is the most powerful skill of the hero, and has a long CD time. After the ultimate skill switch is on, the ultimate skill is displayed in a skill control display area 42, and at the right side, different character objects that can be controlled by a user are shown. Alternatively, it is referred to as that one AI hero has three different skills. As shown in FIG. 6 and FIG. 7, if a skill is in a releasable state, the skill is displayed in the skill control display area 42; otherwise, the skill cannot be released, and is not displayed in the skill control display area 42.

After the start ultimate skill switch is on, the ultimate skill of the AI hero may be set to be manually controlled by using the switch, so that an operation of repeatedly switching between heroes by a player is simplified, and an operation difficulty is lowered. After the switch is tapped, the hero is controlled by AI to release the ultimate skill to a currently specified target, which is equivalent to an operation by the player. The other two small skills are still controlled by AI. When the player fights against a BOSS, the player can better control a battle pace, to prevent AI from releasing a skill tactlessly, and improve battle experience. By means of the switch, a requirement of the player is better met, and the player disables the ultimate skill switch if the player wants AI to control the ultimate skill, and the player enables the switch if manual control on the ultimate skill is required.

Figure 11:
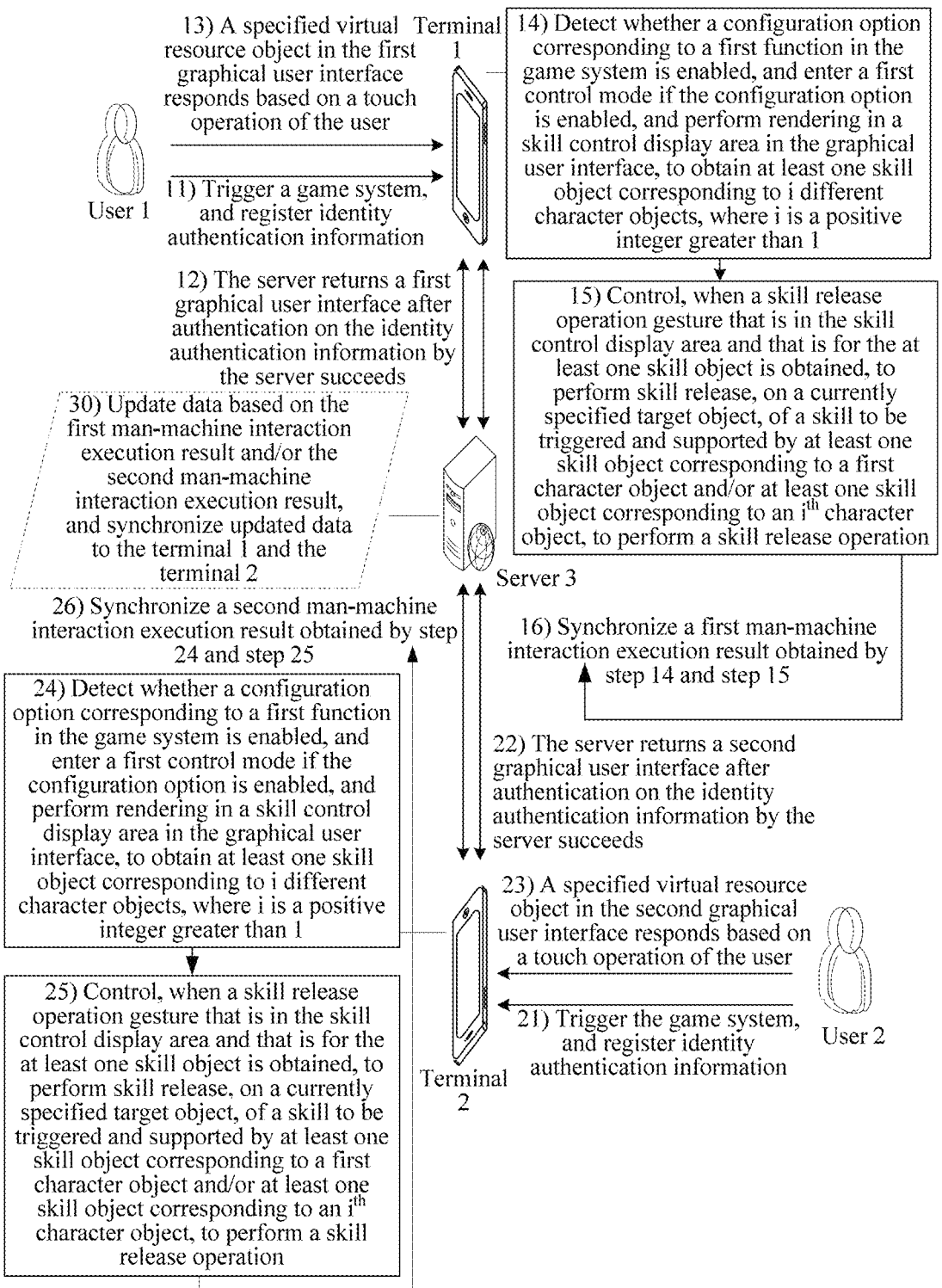
FIG. 11 is a schematic flowchart of implementation of a specific application scenario to which an embodiment of the present application is applied.

Display of the UI and an interaction process in the UI are implemented by an interaction procedure shown in FIG. 11.

FIG. 11 is a schematic flowchart of specific interaction in an information processing method in this application scenario. As shown in FIG. 11, in this application scenario, a terminal 1, a terminal 2, and a server are included. The user 1 performs triggering and control by using the terminal 1, and the user 2 performs triggering and control by using the terminal 2; and the method includes the following steps:

For the user 1, step 11 to step 17 are included.

Step 11: The user 1 triggers a game system by using the terminal 1, and registers identity authentication information, where the identity authentication information may be a user name and a password.

Step 12: The terminal 1 transmits the obtained identity authentication information to the server 3, and the server 3 performs identity authentication, and returns a first graphical user interface to the terminal 1 after the identity authentication succeeds, where the first graphical user interface includes a virtual resource object.

Step 13: A specified virtual resource object (such as an SMS message object in FIG. 3) can respond based on a touch operation of the user 1, and performs a series of virtual operations in step 14 to step 16.

Step 14: Detect whether a configuration option corresponding to a first function in the game system is enabled, and enter a first control mode if the configuration option is enabled, and perform rendering in a skill control display area in the graphical user interface, to obtain at least one skill object corresponding to i different character objects, where i is a positive integer greater than 1.

Step 15: Control, when a skill release operation gesture that is in the skill control display area and that is for the at least one skill object is obtained, to perform skill release, on a currently specified target object, of a skill to be triggered and supported by at least one skill object corresponding to a first character object and at least one skill object corresponding to an $i^{th}$ character object.

Step 16: Synchronize an execution result obtained by performing step 14 and step 15 to the server, or instantly transfer the execution result to the terminal 2 by using the server, or directly forward the execution result to the terminal 2, so that the user 2 that logs in to the game system by using the terminal 2 can respond to the virtual operation of the user 1, so as to implement interaction between multiple terminals. In this application scenario, only interaction between two terminals is used as an example, and during an actual operation, interaction between multiple terminals may be not limited to interaction between the two terminals in this example.

For the user 2, step 21 to step 27 are included for the user 1.

Step 21: The user 2 triggers the game system by using the terminal 2, and registers identity authentication information, where the identity authentication information may be a user name and a password.

Step 22: The terminal 1 transmits the obtained identity authentication information to the server 3, and the server 3 performs identity authentication, and returns a second graphical user interface to the terminal 2 after the identity authentication succeeds, where the second graphical user interface includes a virtual resource object.

Step 23: A specified virtual resource object (such as an SMS message object in FIG. 3) can respond based on a touch operation of the user 2, and performs a series of virtual operations in step 24 to step 26.

Step 24: Detect whether a configuration option corresponding to a first function in the game system is enabled, and enter a first control mode if the configuration option is enabled, and perform rendering in a skill control display area in the graphical user interface, to obtain at least one skill object corresponding to i different character objects, where i is a positive integer greater than 1.

Step 25: Control, when a skill release operation gesture that is in the skill control display area and that is for the at least one skill object is obtained, to perform skill release, on a currently specified target object, of a skill to be triggered and supported by at least one skill object corresponding to a first character object and at least one skill object corresponding to an $i^{th}$ character object.

Step 26: Synchronize an execution result obtained by performing step 24 and step 25 to the server, or instantly transfer the execution result to the terminal 1 by using the server, or directly forward the execution result to the terminal 1, so that the user 1 that logs in to the game system by using the terminal 1 can respond to the virtual operation of the user 2, so as to implement interaction between multiple terminals. In this application scenario, only interaction between two terminals is used as an example, and during an actual operation, interaction between multiple terminals may be not limited to interaction between the two terminals in this example.

Step 30: An optional step: Synchronize or transfer, after receiving a first man-machine interaction execution result obtained by step 14 to step 16 and/or a second interaction execution result obtained by step 24 to step 26, the first man-machine interaction execution result and/or the second interaction execution result to corresponding terminals.

In the several embodiments provided in this application, it should be understood that the disclosed device and method may be implemented in other manners. The described device embodiments are merely examples. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between constituent parts may be implemented through some interfaces. The indirect couplings or communication connections between the devices or units may be implemented in electronic, mechanic, or other forms.

The units described as separate parts may or may not be physically separate, and parts displayed as units may or may not be physical units, may be located in one location, or may be distributed on multiple network units. Some or all of the units may be selected according to actual needs to achieve the objectives of the solutions of the embodiments.

In addition, the functional units in the embodiments of the present application may all be integrated into one processing unit, or each of the units may exist separately, or two or more units are integrated into one unit, and the integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a portable storage device, a read-only memory (ROM), a random access memory (RAM), a magnetic disk, or an optical disc.

Alternatively, when the integrated unit is implemented in a form of a software functional module and sold or used as an independent product, the integrated unit may be stored in a computer-readable storage medium. Based on such an understanding, the technical solutions of the embodiments of the present application essentially, or the part contributing to the existing technology may be implemented in a form of a software product. The computer software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a portable storage device, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

INDUSTRIAL APPLICABILITY

By means of the embodiments of the present application, a first control mode is entered when it is detected that a configuration option corresponding to a first function in a game system is enabled, where the first control mode is a skill release control manner that can be controlled manually. Rendering can be performed in a skill control display area in a graphical user interface, to obtain at least one skill object corresponding to i different character objects. Therefore, it may be directly controlled, when a skill release operation gesture that is in the skill control display area and that is for the at least one skill object is obtained, to perform skill release, on a currently specified target object, of a skill to be triggered and supported by at least one skill object corresponding to a first character object and at least one skill object corresponding to an ith character object, so that it does not need to first switch to a required character object from a current character object and then perform skill release by using a corresponding skill object. In addition, the skill release control manner that can be manually controlled is a controllable skill release control manner and has high controllability and certainty, thereby greatly improving accuracy, and the manner can also adapt to changing requirements of different scenarios, thereby improving precision and efficiency of interaction processing.

What is claimed is:

1. A method for rendering a graphical user interface of an online game system on a display of a terminal having one or more processors and memory storing one or more programs to be executed by the one or more processors, the method comprising:
    rendering, in the graphical user interface, a game scene including a plurality of virtual resource objects, each virtual resource object representing a respective member of a user group of the online game system, wherein the user group includes an end user of the terminal;
    detecting a user input through the graphical user interface by the end user of the terminal;
    in accordance with a determination that the user input is to enable a first function of the online game system:
        invoking a first control mode associated with one of the plurality of virtual resource objects corresponding to the end user of the terminal;
        generating a skill control display area in the graphical user interface;
        rendering, in the skill control display area, a plurality of skill objects, each skill object being associated with a respective member of the user group other than the end user of the terminal;
    while a virtual resource object corresponding to the end user of the terminal remains actively attacking a specified target object in the game scene:
        detecting, from the end user of the terminal, a skill release operation gesture on a predefined skill object associated with another member of the user group in the skill control display area;
        activating a skill release operation associated with the predefined skill object; and
        performing, on the specified target object currently attacked by the end user of the terminal, the skill release operation supported by the another member of the user group in the skill control display area and associated with a skill granted by the another member of the user group to the end user of the terminal.

2. The method according to claim 1, further comprising:
detecting that the end user is in a state of controlling multiple skill objects in the skill control display area, wherein the multiple skill objects are all in a releasable state;
selecting a subset of the multiple skill objects for the skill release operation; and
after the skill release operation is performed on the subset of the multiple skill objects:
removing, from the skill control display area, the subset of the multiple skill objects for a preset time period; and
displaying only the remainder of the multiple skill objects in the skill control display area.

3. The method according to claim 2, further comprising:
after the preset time period, restoring the previously hidden subset of the multiple skill objects in the skill control display area.

4. The method according to claim 1, further comprising:
detecting whether a configuration option corresponding to the first function in the game system is enabled;
entering a second control mode in accordance with a determination that the configuration option is enabled, wherein, in the second control mode, a subset of the multiple skill objects corresponding to a remainder of the user group are automatically controlled by the online game system;
detecting, in the skill control display area, the skill release operation gesture that is associated with the predefined skill object; and
performing, on the specified target object, a skill supported by at least one skill object corresponding to the remainder of the user group, wherein the online game system automatically controls the release of one or more of the remaining skill objects in a combined manner.

5. A terminal comprising:
one or more processors;
a display;
memory; and
one or more programs stored in the memory, the one or more programs configured to be executed by the one or more processors and cause the terminal to render a graphical user interface of an online game system on the display by performing a plurality of operations including:
rendering, in the graphical user interface, a game scene including a plurality of virtual resource objects, each virtual resource object representing a respective member of a user group of the online game system, wherein the user group includes an end user of the terminal;
detecting a user input through the graphical user interface by the end user of the terminal;
in accordance with a determination that the user input is to enable a first function of the online game system:
invoking a first control mode associated with one of the plurality of virtual resource objects corresponding to the end user of the terminal;
generating a skill control display area in the graphical user interface;
rendering, in the skill control display area, a plurality of skill objects, each skill object being associated with a respective member of the user group other than the end user of the terminal;
while a virtual resource object corresponding to the end user of the terminal remains actively attacking a specified target object in the game scene:
detecting, from the end user of the terminal, a skill release operation gesture on a predefined skill object associated with another member of the user group in the skill control display area;
activating a skill release operation associated with the predefined skill object; and
performing, on the specified target object currently attacked by the end user of the terminal, the skill release operation supported by the another member of the user group in the skill control display area and associated with a skill granted by the another member of the user group to the end user of the terminal.

6. The terminal according to claim 5, wherein the plurality of operations further comprise:
detecting that the end user is in a state of controlling multiple skill objects in the skill control display area, wherein the multiple skill objects are all in a releasable state;
selecting a subset of the multiple skill objects for the skill release operation; and
after the skill release operation is performed on the subset of the multiple skill objects:
removing, from the skill control display area, the subset of the multiple skill objects for a preset time period; and
displaying only the remainder of the multiple skill objects in the skill control display area.

7. The terminal according to claim 6, wherein the plurality of operations further comprise:
after the preset time period, restoring the previously hidden subset of the multiple skill objects in the skill control display area.

8. The terminal according to claim 5, wherein the plurality of operations further comprise:
detecting whether a configuration option corresponding to the first function in the game system is enabled;
entering a second control mode in accordance with a determination that the configuration option is enabled, wherein, in the second control mode, a subset of the multiple skill objects corresponding to a remainder of the user group are automatically controlled by the online game system;
detecting, in the skill control display area, the skill release operation gesture that is associated with the predefined skill object; and
performing, on the specified target object, a skill supported by at least one skill object corresponding to the remainder of the user group, wherein the online game system automatically controls the release of one or more of the remaining skill objects in a combined manner.

9. A non-transitory computer readable storage medium storing one or more programs, wherein the one or more programs, when executed by one or more processors of a terminal, cause the terminal to perform a plurality of operations including:
rendering, in the graphical user interface, a game scene including a plurality of virtual resource objects, each virtual resource object representing a respective member of a user group of the online game system, wherein the user group includes an end user of the terminal;

detecting a user input through the graphical user interface by the end user of the terminal;

in accordance with a determination that the user input is to enable a first function of the online game system:

invoking a first control mode associated with one of the plurality of virtual resource objects corresponding to the end user of the terminal;

generating a skill control display area in the graphical user interface;

rendering, in the skill control display area, a plurality of skill objects, each skill object being associated with a respective member of the user group other than the end user of the terminal;

while a virtual resource object corresponding to the end user of the terminal remains actively attacking a specified target object in the game scene:

detecting, from the end user of the terminal, a skill release operation gesture on a predefined skill object associated with another member of the user group in the skill control display area;

activating a skill release operation associated with the predefined skill object; and performing, on the specified target object currently attacked by the end user of the terminal, the skill release operation supported by the another member of the user group in the skill control display area and associated with a skill granted by the another member of the user group to the end user of the terminal.

10. The non-transitory computer readable storage medium according to claim 9, wherein the plurality of operations further comprise:

detecting that the end user is in a state of controlling multiple skill objects in the skill control display area, wherein the multiple skill objects are all in a releasable state;

selecting a subset of the multiple skill objects for the skill release operation; and after the skill release operation is performed on the subset of the multiple skill objects:

removing, from the skill control display area, the subset of the multiple skill objects for a preset time period; and displaying only the remainder of the multiple skill objects in the skill control display area.

11. The non-transitory computer readable storage medium according to claim 10, wherein the plurality of operations further comprise:

after the preset time period, restoring the previously hidden subset of the multiple skill objects in the skill control display area.

12. The non-transitory computer readable storage medium according to claim 9, wherein the plurality of operations further comprise:

detecting whether a configuration option corresponding to the first function in the game system is enabled;

entering a second control mode in accordance with a determination that the configuration option is enabled, wherein, in the second control mode, a subset of the multiple skill objects corresponding to a remainder of the user group are automatically controlled by the online game system;

detecting, in the skill control display area, the skill release operation gesture that is associated with the predefined skill object; and performing, on the specified target object, a skill supported by at least one skill object corresponding to the remainder of the user group, wherein the online game system automatically controls the release of one or more of the remaining skill objects in a combined manner.

\* \* \* \* \*